United States Patent
Turner et al.

[11] Patent Number: 5,150,619
[45] Date of Patent: Sep. 29, 1992

[54] VORTEX FLOWMETERS

[75] Inventors: John T. Turner, Stockport, England; Czeslaw O. Popiel, Poznan, Poland

[73] Assignee: Schlumberger Industries, Limited, Farnborough, United Kingdom

[21] Appl. No.: 548,396

[22] Filed: Jul. 5, 1990

[30] Foreign Application Priority Data

Jul. 12, 1989 [GB] United Kingdom ............... 8915994

[51] Int. Cl.⁵ .............................................. G01F 1/32
[52] U.S. Cl. ............................................... 73/861.22
[58] Field of Search ............ 73/861.22, 861.24, 861.23

[56] References Cited

U.S. PATENT DOCUMENTS

| | | | |
|---|---|---|---|
| 3,589,185 | 6/1971 | Burgess | 73/861.22 |
| 3,650,152 | 3/1972 | White | 73/861.22 |
| 3,878,715 | 4/1975 | Kobayashi | 73/861.22 |
| 4,030,355 | 6/1977 | Herzl | 73/861.24 |
| 4,782,710 | 11/1988 | Nugumo et al. | 73/861.22 |

FOREIGN PATENT DOCUMENTS 0240772 10/1987 European Pat. Off. .
2453973 12/1976 Fed. Rep. of Germany .

Primary Examiner—Herbert Goldstein
Attorney, Agent, or Firm—D. V. Gaudier

[57] ABSTRACT

A vortex flowmeter is provided with a vortex-inducing bluff body in the form of a first, upstream, cylinder having a semi-circular or semi-ellipsoidal front surface and a planar rear surface, and a second, downstream, cylinder having a planar front surface and a planar or concave rear surface. The rear surface of the upstream cylinder is parallel to the front surface of the downstream cylinder, and separated from it by a gap whose width is preferably about 25% of the diameter of the upstream cylinder.

14 Claims, 1 Drawing Sheet

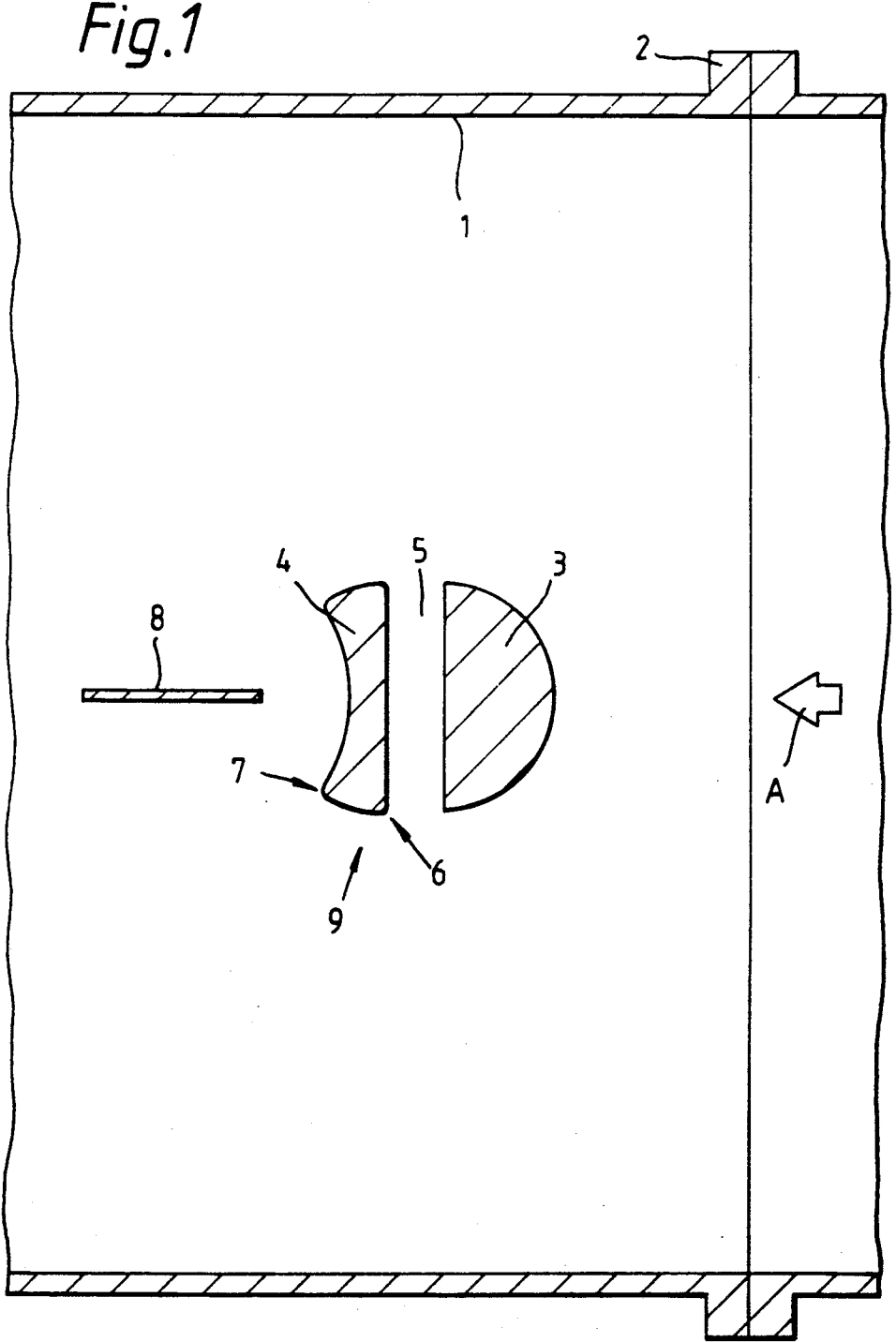
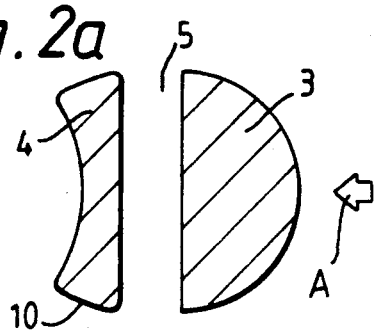
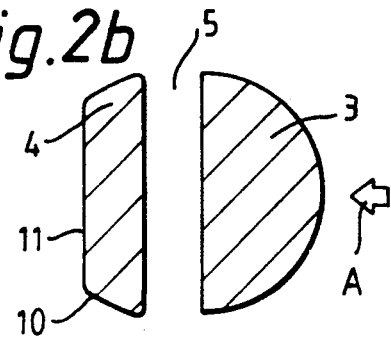

VORTEX FLOWMETERS

This invention relates to flowmeters of the vortex shedding variety. In particular the invention relates to a bluff body vortex generator for use in such flowmeters and which is designed to improve the repeatability and accuracy of the flowmeter.

The principle of the vortex shedding phenomenon in its application to measurement of the flow rate in a channel or a pipe is that the vortex shedding frequency is proportional to the flow velocity near the body which is the cause of the vortex shedding.

In general, a vortex shedding flowmeter comprises a passage through which the fluid to be measured can flow, an obstacle (i.e. the bluff body) capable of generating fluid vortices, and a sensing means for indicating the rate of flow.

The purpose of the bluff body is to generate strong, stable fluid vortices which can be differentiated from factors such as random velocity fluctuations due to turbulence, which factors tend to degrade the signal. The production of a strong flow-related signal assists in alleviating problems in the processing of signals received from transducers used to detect the vortex shedding.

Meters have been designed which attempt to overcome the aforementioned problem. A paper presented by Ahmed in the Institution of Chemical Engineers North Western Branch Papers, 1984, describes a vortex meter incorporating two bluff bodies in tandem, one rectangular and the other circular in shape. The method described in the paper for detecting vortex shedding used a sensor placed entirely outside the process fluid, thereby making the system more robust and improving the performance of the flowmeter.

Other investigations involving identification of the optimum cross-sectional shape of the vortex generator have been carried out. These involve the measurement of the quality of signal derived from the vortex shedding process. The studies have included both individual and multiple bodies with combinations of shapes, including cylinders of square, triangular, elliptical, conical, D-shaped and circular cross-sections. As used herein, the term "cylinder" means a body having a cross-sectional area of any shape which is substantially uniform along its longitudinal axis.

It is an object of the present invention to provide a vortex flowmeter which generates strong regular vortices with a high signal-to-noise ratio, so that many of the measurement problems associated with the detection and interpretation of the flow signal are alleviated.

In accordance with the present invention, there is provided a flowmeter for measuring the rate of flow of a fluid, the flowmeter comprising:

a flow tube forming a passage for the fluid to be measured;

a bluff body disposed in the flow tube for inducing vortices in the flowing fluid, the bluff body comprising a first, upstream, cylinder having an arcuate front surface and a planar rear surface, and a second, downstream, cylinder having a planar front surface and a planar or concave rear surface, the two cylinders being separated at their adjacent surfaces by a gap whose width is up to fifty per cent of the diameter of the upstream cylinder; and a sensing means for measuring the frequency of the vortices shed by the bluff body.

A suitable sensing means may incorporate moving parts such as flags, cantilevers or diaphragms capable of responding to the fluid velocity or pressure. Alternatively, a stationary sensor, such as a fixed plate with a strain gauge, or an optical sensor incorporating fiber optics, or an ultrasonic sensor, or a thermal detector, may be employed.

According to one implementation of the invention, said upstream cylinder may take the form of a semi-circular cylinder.

Alternatively, said upstream cylinder may take the form of a semi-ellipsoidal cylinder.

In a preferred embodiment of the invention the trailing edges of said upstream cylinder comprise sharp edges.

In a further embodiment of the invention said gap separating the two cylinders has parallel walls to allow a piston-like movement of the fluid from one side to the other as shedding occurs.

In yet another embodiment of the invention, the front edges of said trailing cylinder are slightly rounded, to facilitate fluid flow from the gap. A further advantage here, bearing in mind that the edges are the most exposed part of the bluff body, is that rounded edges will be much more resistant to erosion by the fluid. Moreover, this part of the bluff body is the best location for a sensor to detect the vortex shedding frequency, using perhaps a heat transfer or pressure sensor.

In a still further embodiment of the invention, the rear edges of said trailing cylinder are left sharp. During the flowing period, the fluid moving towards the edge is separated from the edge and immediately starts to form a new vortex.

The invention will now be described, by way of example only, with reference to the accompanying drawings, in which:

FIG. 1 is a longitudinal section taken through a vortex flowmeter in accordance with the invention; and FIGS. 2a and 2b shows several variations in the geometry of the vortex generator according to the invention.

FIG. 1 shows a sectional view of a vortex flowmeter which comprises a flow tube 1 provided with end flanges 2 to facilitate coupling to the channel or pipe through which the fluid to be measured flows: the fluid flows through the flowmeter in the direction of the arrow A. The flowmeter comprises a bluff body vortex generator 9 positioned perpendicularly to the central flow axis of the flow tube 1, and consisting of two cylinders, an upstream cylinder 3 in the form of a semi-circular cylinder, and a downstream cylinder 4 in the form of a part of a semi-circular cylinder with a concave rear surface. The two cylinders are separated at their planar surfaces by a gap 5 which is twenty-five per cent of the diameter of the upstream cylinder. Thus the two cylinders 3, 4 can be regarded as a near circular section cylinder which has been split across its diameter and then separated by the gap 5.

The front edges 6 of the downstream cylinder are slightly rounded with a radius of four per cent of the diameter of the upstream cylinder. The rear edges 7 of the downstream cylinder are sharp with a radius of one per cent of the diameter of the upstream cylinder.

Experiments have shown that behind the vortex generator 9, very strong and regular vortices are obtained. The shedding of these vortices produces periodic variations of pressure at the openings of the gap 5, transverse to the flow. This results in an oscillation of the fluid in the gap 5, and therefore in alternating suction and blowing actions on the boundary layer produced by the upstream cylinder 3.

During the blowing period, the boundary layer separates behind the gap 5 at the sharp trailing edges 7 and together with a jet emerging from the gap creates a thick shear layer. Simultaneously, at the same side of the vortex generator 9, a lower pressure induces a strong movement of the fluid at the rear concave surface towards the separating shear layer. This fluid unites with the shear layer and these two components roll-up together and develop into a very strong vortex. Finally, the developing vortex causes an increase of pressure at the same side of the vortex generator and the suction part of the cycle commences. During the corresponding blowing period on the opposite side of the vortex generator 9, the new-born vortex is shed into the wake.

The vortex shedding frequency is detected in any convenient manner, e.g. by a thermal sensor consisting of an electrically heated film mounted on the upstream face of a supporting element 8 positioned parallel with respect to both the direction of flow and the longitudinal axis of the bluff body. An electrical feedback bridge to which the sensor is connected provides signals related to the frequencies of the vortex shedding from the vortex generator 9.

Detailed studies have revealed that this combination of a gap in a vortex generator in the form of a split circular cylinder incorporating a flat or preferably concave rear surface leads to a particularly strong vortex shedding wake structure, in which the individual vortices are formed very close the rear surface of the vortex generator 9.

Visualisation of the flow suggests that the concave rear surface helps to maintain a laminar core in each vortex. In any event, the circulation per vortex is higher and the signal-to-noise ratio of the vortex shedding signal is increased significantly when compared with previous designs of vortex generator. In turn, this ensures that the maximum signal strength is available for detection.

Many modifications can be made to the described embodiment of the invention. For example, sensors other than thermal sensors can be used for detecting the vortex shedding frequency: indeed, since the vortex generator 9 ensures that the variations in the flow closely adjacent thereto are relatively high, detection of the vortex shedding signal by a sensor conveniently located in the vortex generator itself is feasible. Further, slight variations can be made to the shape of the vortex generator 9, in particular to the downstream cylinder 4, as shown in FIG. 2. Thus, in FIG. 2a, the downstream cylinder 4 has flat sides 10 (instead of part-circular), typically inclined at 20° to the axis of the flow tube 1 while in FIG. 2b, the downstream cylinder 4 has a flat rear face 11 (instead of concave), as well as the flat sides 10 of FIG. 2a. Additionally, the gap 5 can be increased in width to up to 50% of the diameter of the upstream cylinder, while the upstream cylinder 3 can be semi-ellipsoidal instead of semi-circular.

We claim:

1. A flowmeter for measuring the rate of flow of fluid, the flowmeter comprising:
    a flow tube forming a passage for the fluid to be measured:
    a bluff body disposed in the flow tube for inducing vortices in the flowing fluid, the bluff body comprising a first, upstream, cylinder having an arcuate front surface and a planar front surface and a planar or concave rear surface, the two cylinders being separated at their adjacent surfaces by a gap whose width is up to fifty per cent of the diameter of the upstream cylinder; and
    a sensing means for measuring the frequency of the vortices shed by the bluff body;
    wherein said second cylinder has front edges which are slightly rounded to facilitate fluid flow from the gap.

2. A flowmeter as claimed in claim 1, wherein said upstream cylinder takes the form of a semi-circular cylinder.

3. A flowmeter as claimed in claim 1, wherein said upstream cylinder takes the form of a semi-ellipsoidal cylinder.

4. A flowmeter as claimed in claim 1, wherein the trailing edges of said upstream cylinder comprise sharp edges.

5. A flowmeter as claimed in claim 1, wherein said gap separating the two cylinders has parallel walls to allow a piston-like movement of the fluid from one side to the other as shedding occurs.

6. A flowmeter as claimed in claim 1, wherein the rear edges of said trailing cylinder comprise sharp edges.

7. A flow meter as claimed in claim 1, wherein the width of said gap is approximately twenty five percent of the diameter of the upstream surface.

8. A flowmeter for measuring the rate of flow of a fluid, the flowmeter comprising:
    a flow tube forming a passage for the fluid to be measured:
    a bluff body disposed in the flow tube for inducing vortices in the flowing fluid, the bluff body comprising a first, upstream, cylinder having an arcuate front surface and a planar rear surface, and a second, downstream, cylinder having a planar front surface and a planar or concave rear surface, the two cylinders being separated at their adjacent surfaces by a gap whose width is approximately twenty-five percent of the diameter of the upstream cylinder; and
    a sensing means for measuring the frequency of the vortices shed by the bluff body.

9. A flowmeter as claimed in claim 8, wherein said upstream cylinder takes the form of a semi-circular cylinder.

10. A flowmeter as claimed in claim 8, wherein said upstream cylinder takes the form of a semi-ellipsoidal cylinder.

11. A flowmeter as claimed in claim 8, wherein the trailing edges of said upstream cylinder comprise sharp edges.

12. A flowmeter as claimed in claim 8, wherein said gap separating the two cylinders has parallel walls to allow a piston-like movement of the fluid from one side to the other as shedding occurs.

13. A flowmeter as claimed in claim 8, wherein the front edges of said trailing cylinder are slightly rounded, to facilitate fluid flow from the gap.

14. A flowmeter as claimed in claim 8, wherein the rear edges of said trailing cylinder comprise sharp edges.

* * * * *

UNITED STATES PATENT AND TRADEMARK OFFICE
CERTIFICATE OF CORRECTION

PATENT NO. : 5,150,619

DATED : September 29, 1992

INVENTOR(S) : Turner et al

It is certified that error appears in the above—identified patent and that said Letters Patent is hereby corrected as shown below:

Column 4, line 4, should read: "front surface and a planar rear surface, and a second, downstream cylinder having a planar front surface and a planar".

Signed and Sealed this

Twenty-eighth Day of September, 1993

Attest:

BRUCE LEHMAN

Attesting Officer

Commissioner of Patents and Trademarks